(12) United States Patent
Nanjo

(10) Patent No.: US 8,347,472 B2
(45) Date of Patent: Jan. 8, 2013

(54) TOOL FOR AUTOMATICALLY MOUNTING A SEAT COVERING-TENSIONING CLIP

(75) Inventor: Masanao Nanjo, Tochigi (JP)

(73) Assignee: TS TECH Co., Ltd., Saitama (JP)

( * ) Notice: Subject to any disclaimer, the term of this patent is extended or adjusted under 35 U.S.C. 154(b) by 512 days.

(21) Appl. No.: 12/303,845

(22) PCT Filed: Jun. 8, 2007

(86) PCT No.: PCT/JP2007/062061
§ 371 (c)(1),
(2), (4) Date: Apr. 15, 2010

(87) PCT Pub. No.: WO2007/142363
PCT Pub. Date: Dec. 13, 2007

(65) Prior Publication Data
US 2011/0131777 A1    Jun. 9, 2011

(30) Foreign Application Priority Data
Jun. 8, 2006   (JP) ................................. 2006-159600

(51) Int. Cl.
*B25B 27/14* (2006.01)
(52) U.S. Cl. .................................. 29/243.56; 29/243.5
(58) Field of Classification Search ............... 29/243.56, 29/243.5, 243.55
See application file for complete search history.

(56) References Cited

U.S. PATENT DOCUMENTS

| | | | | |
|---|---|---|---|---|
| 3,068,485 A | * | 12/1962 | Lingle et al. ................. | 72/407 |
| 3,133,288 A | * | 5/1964 | Ohgren ..................... | 29/243.56 |
| 3,160,890 A | * | 12/1964 | Lefebvre ................... | 72/407 |
| 5,161,583 A | * | 11/1992 | Ackerman .................. | 140/93 A |
| 5,881,452 A | * | 3/1999 | Nowell et al. ............... | 29/816 |
| 2011/0131777 A1 | * | 6/2011 | Nanjo ..................... | 29/243.56 |

FOREIGN PATENT DOCUMENTS

| | | |
|---|---|---|
| JP | 58-106158 | 7/1983 |
| JP | 5-31699 | 4/1993 |
| JP | 2000-117657 | 4/2000 |
| JP | 2003-136422 | 5/2003 |
| JP | 2006-95093 | 4/2006 |
| WO | 2006/036006 A1 | 4/2006 |

* cited by examiner

OTHER PUBLICATIONS

International Search Report dated Aug. 7, 2007 of International Patent Application No. PCT/JP2007/062061.

*Primary Examiner* — Lee D Wilson
(74) *Attorney, Agent, or Firm* — Dann, Dorfman, Herrell and Skillman, P.C.

(57) ABSTRACT

A clip automatic-mounting tool comprises a clip holder (10) for holding and retaining a clip (C) to a first axial portion of a tensioning wire (W) embedded in a cushioned padding (P) for a seat, a drive cylinder (13) for moving the clip holder (10), a guide plate (11) including a portion having a first width substantially equal to that of the clip holder (10), and a tip end portion having a second width wider than the first width, the clip holder (10) being adapted to be moved along the guide plate (11) by the drive cylinder (13), and an insertion arm (12) extending along a side edge of the tip end portion of the guide plate (11) and forward protruding in an oblique upward direction from the tip end portion of the guide plate (11), the insertion arm (12) having a cutout groove (12b) formed in a tip end portion (12a) thereof for engagingly receiving a second axial portion of the wire (W), which is spaced from the first axial portion of the wire (W), when the insertion arm (12) is inserted into the cushioned padding (P).

5 Claims, 4 Drawing Sheets

TOOL FOR AUTOMATICALLY MOUNTING A SEAT COVERING-TENSIONING CLIP

TECHNICAL FIELD

The present invention relates to an automatic mounting tool for automatically mounting a clip to an axial portion of a tensioning wire embedded in a cushioned padding for a seat, the clip being adapted to be retained between a tensioning cord of a seat covering or seat skin covering the cushioned padding and the axial portion of the tensioning wire.

BACKGROUND ART

In a vehicle seat, a tensioning clip is used for causing a terminal portion of a seat skin covering a cushioned padding for the seat to be tension-retained to the cushioned padding (Japanese Patent Application Laid-Open No. 2006-95093). This clip includes a substantially U-shaped body, a chuck portion having a pair of inverted claws extending inward from both ends of the substantially U-shaped body, and a substantially J-shaped hook portion extending from an outer surface of a bottom of the substantially U-shaped body in the direction opposite to an opening of the substantially U-shaped body. The terminal portion of the seat skin is provided with a tensioning cord having a welt. The terminal portion of the seat skin is retained to the cushioned padding by causing the welt of the tensioning cord to be received in the opening of the substantially U-shaped body of the clip while deforming the claws of the chuck portion of the clip, causing the welt to be held by the chuck portion of the clip, and causing the hook portion of the clip to be hooked to an axial portion of a tensioning wire embedded in the cushioned padding.

Retaining of this type of tensioning clip to the welt of the tensioning cord of the seat skin and the axial portion of the tensioning wire embedded in the cushioned padding is performed exclusively by manual operation by a worker which takes a lot of labor and time

SUMMARY OF THE INVENTION

It is an object of the present invention to provide an automatic mounting tool which can automatically mount a clip for tensioning a seat skin for a seat to an axial portion of a tensioning wire embedded in a cushioned padding for the seat.

It is another object of the present invention to provide an automatic mounting tool which is convenient in operation, and can easily hold a clip for tensioning a seat skin for a seat and positively mount the clip to an axial portion of a tensioning wire embedded in a cushioned padding for the seat, while precisely restricting a mounting orientation of the clip.

In accordance with the present invention, there is provided an automatic mounting tool for automatically mounting a clip to an axial portion of a tensioning wire embedded in a cushioned padding for a seat. The clip is adapted to be retained between a tensioning cord of a seat skin covering the cushioned padding and the axial portion of the tensioning wire. The clip includes a hook portion to be hooked and retained to the axial portion of the tensioning wire. The clip automatic-mounting tool comprises a base frame, a drive cylinder provided on a rearward portion of the base frame, the drive cylinder having a rod, a guide plate extending forward from a forward end portion of the base frame, a clip holder for holding the clip so as to allow the hook portion of the clip to be protruded forward from the clip holder, the clip holder being connected to a tip end of the rod of the drive cylinder and adapted to be slid along the guide plate by drive of the drive cylinder, and an insertion arm extending along a side of a tip end portion of the guide plate and forward protruding in an oblique upward direction from the tip end portion of the guide plate, the insertion arm having a length enough to allow a tip end portion of the insertion arm to reach a position just under the axial portion of the tensioning wire when the insertion arm is inserted into the cushioned padding, the insertion arm having a cutout groove formed in the tip end portion thereof for engagingly receiving the axial portion of the tensioning wire when the insertion arm is inserted into the cushioned padding, and the clip holder being adapted to allow the hook portion of the clip held thereby to be automatically retained to the axial portion of the tensioning wire when the clip holder is moved forward by the drive cylinder.

The clip automatic-mounting tool constructed as discussed above includes the clip holder for holding the clip, the guide plate supporting the clip holder so as to allow the clip holder to be slid thereon, the insertion arm having the cutout groove for engagingly receiving the axial portion of the tensioning wire, and the drive cylinder for moving the clip holder. In the clip automatic-mounting tool, the clip is held by the clip holder with the hook portion thereof being protruded forward of the clip holder. In this condition, when the insertion arm of the automatic mounting tool is inserted into the cushioned padding in such a manner that the tip end portion of the insertion arm reaches the position just under the axial portion of the tensioning wire embedded in the cushioned padding, the cutout groove of the insertion arm can engagingly receive the axial portion of the tensioning wire. In the condition where the cutout groove of the insertion arm has engagingly received the axial portion of the tensioning wire, when the drive cylinder is driven, the clip holder is moved forward along the guide plate, to thereby cause the hook portion of the clip to be automatically hooked to the axial portion of the tensioning wire which has been engagingly received in the cutout groove of the insertion arm. Thus, the clip can be efficiently mounted to the axial portion of the tensioning wire.

The clip holder may be formed in a laterally opening U-shape. An upper horizontal portion of the clip holder may have a chamfered portion provided on an inner surface of a tip end portion thereof and having an oblique slope. In this case, the clip can be smoothly received into an opening of the clip holder with the hook portion being protruded forward of the clip holder, while being guided by the chamfered portion of the upper horizontal portion of the clip holder.

Moreover, the guide plate may be provided with a guide edge portion rising up from a side edge of the tip end portion of the guide plate for preventing lateral shift of the clip held by the clip holder, during the movement of the clip holder. In this case, when the drive cylinder is driven, the hook portion of the clip held by the clip holder can be stably moved, while being guided by the guide edge portion, toward the axial portion of the tensioning wire which is engagingly received in the cutout groove of the insertion arm.

Moreover, the cutout groove of the insertion arm may extend along a first hypothetical horizontal line which passes through the tip end portion of the insertion arm and is perpendicular to a second hypothetical horizontal line which is parallel to the guide plate and passes through a curved region of the hook portion of the clip held by the clip holder, a substantially center region of a bottom of the cutout groove being located on the first hypothetical horizontal line. In this case, when the drive cylinder is driven, the axial portion of the tensioning wire which is engagingly received in the cutout groove of the insertion arm can be positively and precisely received in the curved region of the hook portion of the clip.

The clip automatic-mounting tool may be configured in the form of a hand gun and further include a grip attached to the base frame and a trigger provided at the grip for actuating the drive cylinder. In this case, it is possible to provide a clip automatic-mounting tool which is convenient in operation and facilitates improvement in operation efficiency.

BEST MODE FOR CARRYING OUT THE INVENTION

Figure 1:
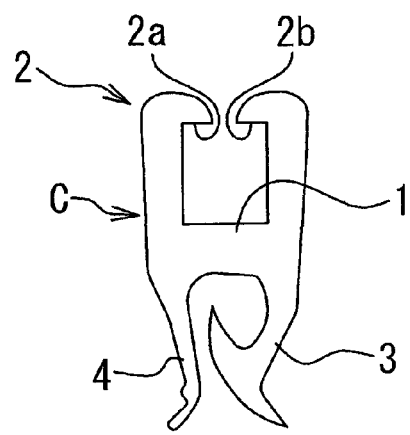
FIG. 1 is a schematic side view illustrating an example of a clip which can be handled by a clip automatic-mounting tool according to an embodiment of the present invention.

Referring to FIG. 1, there is illustrated a clip C which is to be automatically attached to a first region of an axial portion of a tensioning wire embedded in a cushioned padding for a seat, by a clip automatic-mounting tool according to the present invention. The clip C includes a substantially U-shaped body 1, a chuck portion 2 having a pair of spaced apart inverted-pawls 2a, 2b protruding inward from both ends of the substantially U-shaped body 1, a substantially J-shaped hook portion 3 extending from one of sides of the substantially U-shaped body 1 in the direction opposite to an opening of the substantially U-shaped body 1, and a guide portion 4 extending from the other of the sides of the substantially U-shaped body 1 in the direction opposite to the opening of the substantially U-shaped body 1, the guide portion 4 being spaced apart from the hook portion 3. The guide portion 4 serves as means to allow the first region of the axial portion of the tensioning wire W (see FIG. 8) embedded in the cushioned padding to be guided toward the hook portion 3. The clip C is formed of any suitable resin as a one-piece member comprising the substantially U-shaped body 1, the chuck portion 2, the hook portion 3, and the guide portion 4.

Figure 2:
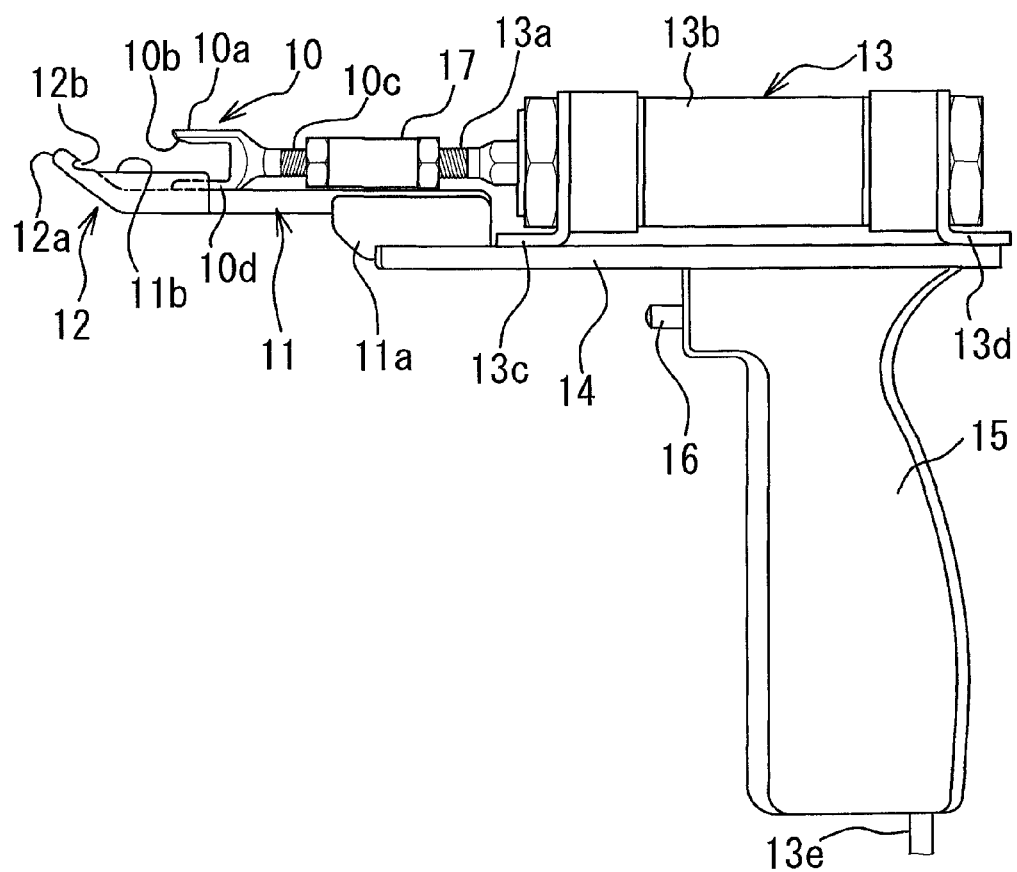
FIG. 2 is a schematic side view illustrating the clip automatic-mounting tool according to the embodiment of the present invention.

Referring to FIG. 2, there is illustrated a clip automatic-mounting tool according to an embodiment of the present invention. The clip automatic-mounting tool includes a clip holder 10 of a laterally opening U-shape as viewed from a side, a guide plate 11 for guiding the clip holder 10, an insertion arm 12 for engagingly retaining a second region of the axial portion of the tensioning wire embedded in the cushioned padding, a drive cylinder 13 for driving the clip holder 10, a base frame 14 on which the guide plate 11 and the drive cylinder 13 are installed, a grip 15 attached to the base frame 14, and a trigger 16 which serves as an operation switch for actuating the drive cylinder 13. The second region of the axial portion of the tensioning wire is spaced from the first region of the axial portion of the tensioning wire in an axial direction of the tensioning wire.

Figure 3:
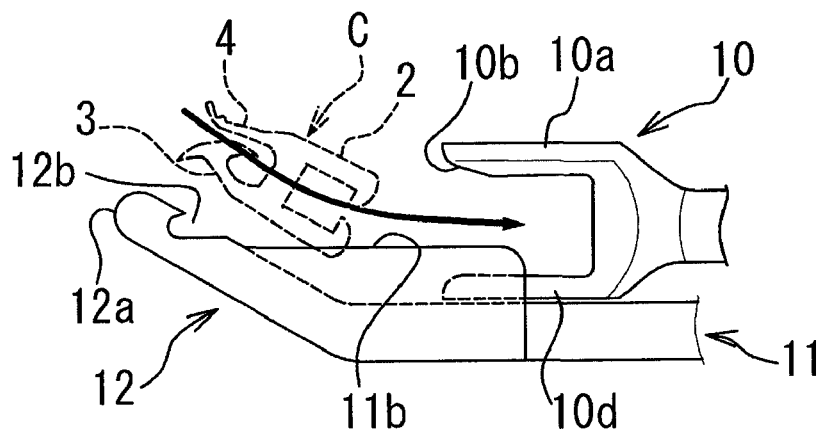
FIG. 3 is a schematic side view mainly illustrating a clip holder which is one of components of the clip automatic-mounting tool shown in FIG. 2.

The clip C shown in FIG. 1 is set to the clip holder 10 with the body 1, including the chuck portion 2, being received in an opening of the substantially U-shaped clip holder 10 and with the hook portion 3 and the guide portion 4 being projected forward of the clip holder 10. In the illustrated embodiment, in order that the body 1 of the clip C which includes the chuck portion 2 can be smoothly and easily inserted into the opening of the clip holder 10 from an upper direction as shown in FIG. 3, the substantially U-shaped clip-holder 10 has a chamfered portion 10b provided on an inner surface of a tip end region of an upper horizontal portion 10a thereof and having an oblique slope.

The clip holder 10 includes an extension rod 10c extending therefrom in the direction opposite to the opening of the clip holder 10. The extension rod 10c of the clip holder 10 is connected through a sleeve nut 17 to a rod 13a of the drive cylinder 13, so that the clip holder 10 is connected to the rod 13a of the drive cylinder 13. More particularly, an entire circumferential inner surface of the sleeve nut 17 has a threaded portion, and an axial portion of each of the extension rod 10c and the cylinder rod 13a has an inverse-threaded portion provided therearound. The extension rod 10c of the clip holder 10 is threadedly connected to one end of the sleeve nut 17. The rod 13a of the drive cylinder 13 is threadedly connected to the other end of the sleeve nut 17. Thus, the clip holder 10 is connected through the sleeve nut 17 to the rod 13a of the drive cylinder 13 in such a manner that an effective length of the clip holder 10 can be adjusted. The clip holder 10 is slidably supported on the guide plate 11, so that according to drive of the drive cylinder 13, the clip holder 10 can be slid on the guide plate 11 while being guided by the guide plate 11.

Figure 4:
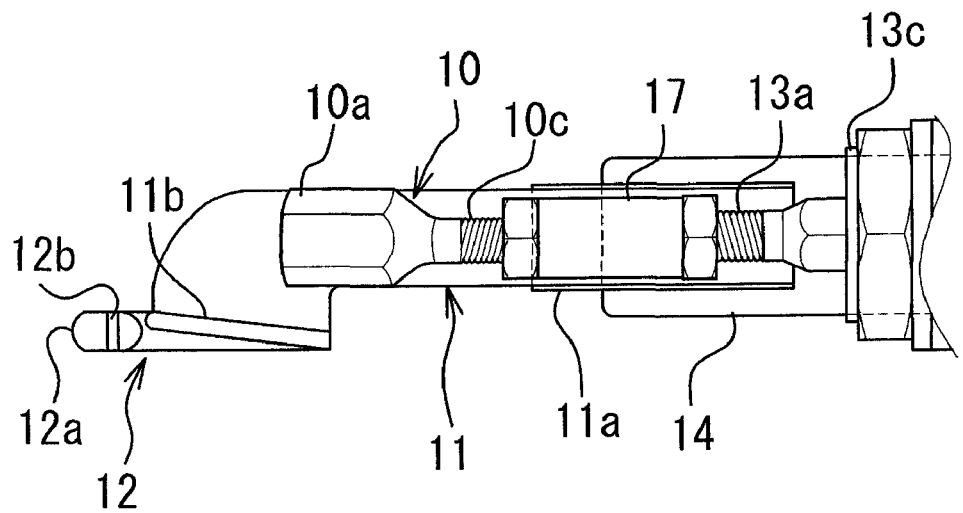
FIG. 4 is a schematic plan view mainly illustrating a guide plate which is one of the components of the clip automatic-mounting tool shown in FIG. 2.
Figure 5:
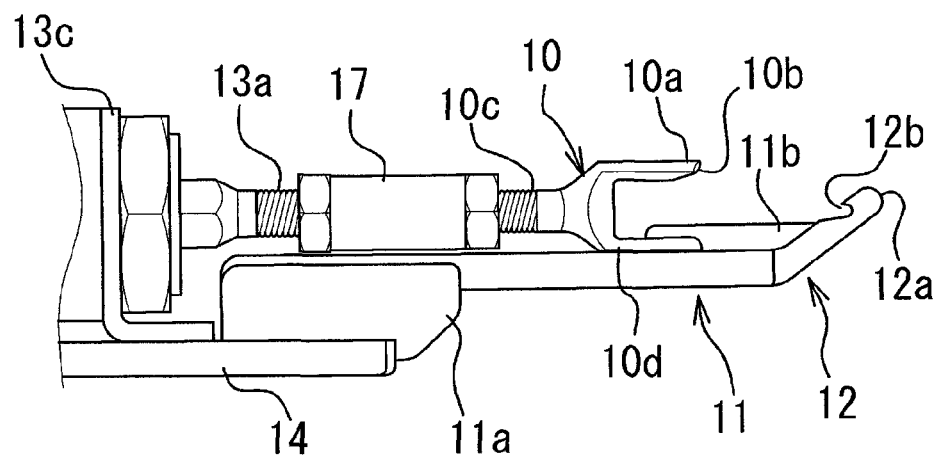
FIG. 5 is a schematic side view mainly illustrating a guide edge portion of the guide plate.

Referring to FIG. 4, the base frame 14 has a block 11a which is provided on a forward end portion of the base frame 14 for setting a height of the guide plate 11. The guide plate 11 is formed of a flat plate material having a width substantially equal to that of the clip holder 10 except a tip end portion thereof, and supported by the block 11a of the base frame 14 so as to extend in the same direction as the clip holder 10 is moved forward. A tip end portion of the guide plate 11 exhibits a substantially arc-shape, projects laterally and has a wider width. As shown in FIGS. 4 and 5, the guide plate 11 is provided with a linear guide edge portion 11b which rises up from a side edge of the tip end portion of the guide plate 11 higher than the lower horizontal portion 10d of the clip holder 10. By this guide edge portion 11b of the guide plate 11, the clip C held by the clip holder 10 can be prevented from being shifted laterally during the movement of the clip holder 10.

Moreover, the guide plate 11 has an insertion arm 12 which is provided so as to extend along the side edge of the tip end portion of the guide plate 11 and protrude forward from the guide plate 11. A tip end portion 12a of the insertion arm 12 is bent so as to extend in an oblique upward direction. The insertion arm 12 has a length enough to allow the tip end portion 12a to reach a position just under the second region of the axial portion of the tensioning wire embedded in the cushioned padding, when the insertion arm 12 of the automatic mounting tool is inserted into the cushioned padding in order that the clip is retained to the first region of the axial portion of the tensioning wire. The tip end portion 12a of the insertion arm 12 has a cutout groove 12b formed therein for engagingly receiving the second region of the axial portion of the tensioning wire.

Figure 6:
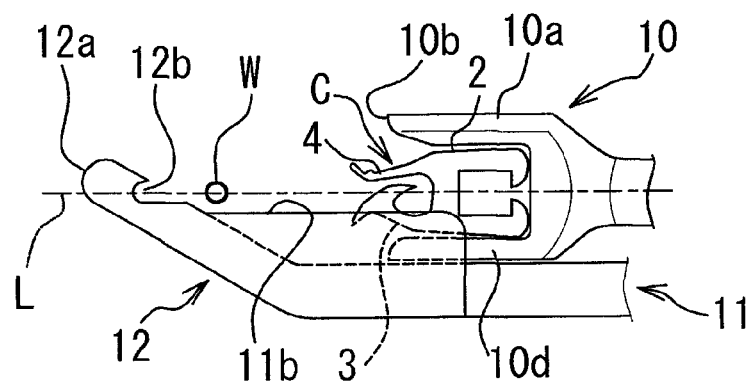
FIG. 6 is a schematic view which is of assistance in explaining a positional relationship between the clip loaded into the clip holder and a cutout groove formed in an insertion arm of the clip automatic-mounting tool.

Referring to FIG. 6, the cutout groove 12b of the insertion arm 12 extends along a first hypothetical horizontal line which passes through the tip end portion 12a of the insertion arm 12 and is perpendicular to a second hypothetical horizontal line L which is parallel to the guide plate 11 and passes through a curved region of the hook portion 3 of the clip C held by the clip holder 10. More particularly, the cutout groove 12b is formed in the insertion arm 12 in such a manner that a substantially center region of a bottom of the cutout groove 12 is located on the first hypothetical horizontal line.

Again referring to FIG. 2, the drive cylinder 13 includes a cylinder body 13b and supported on the base frame 14 through forward and rearward brackets 13c, 13d of substantially L-shapes with the cylinder body 13b being interposedly held between the forward and rearward brackets 13c, 13d. An air hose 13e whose one end is connected to a compressed air supplying source (not shown) is connected at the other end thereof to the drive cylinder 13. More particularly, the air hose 13e extends from the compressed air supplying source, passes through the interior of the grip 15, and is connected to the cylinder body 13b. The drive cylinder 13 is configured so as to be driven using compressed air supplied through the air hose 13e from the compressed air supplying source, as a drive source.

The grip 15 is applied at an upper end thereof onto an underside of a rearward portion of the base frame 14 and attached to the underside of the rearward portion of the base frame 14. As discussed above, the grip 15 is provided with the trigger 16 which acts as the operation switch for actuating the drive cylinder 13. An entire tool is configured in the form of a hand gun.

Figure 7:
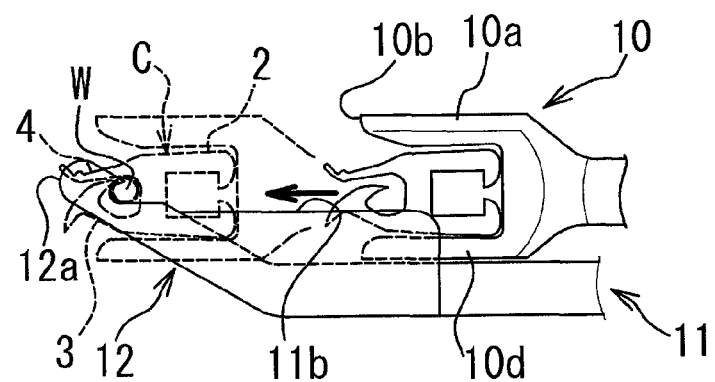
FIG. 7 is a schematic view which is of assistance in explaining mounting operation of the clip by the clip automatic-mounting tool.

A worker can operate the clip automatic-mounting tool constructed as discussed above, while gripping the grip 15. When the clip C is to be retained to the first region of the axial portion of the tensioning wire W, the clip C is loaded into the clip holder 10 with the body 1, including the chuck portion 2, being received within the opening of the clip holder 10, with the hook portion 3 being projected forward of the clip holder 10 so as to extend along the lower horizontal portion 10d of the clip holder 10, and with the guide portion 4 being projected forward of the clip holder 10, as shown in FIG. 7.

The tip end portion 12a of the insertion arm 12 is then inserted into a recess portion of the cushioned padding P (see FIG. 8), in which the tensioning wire W embedded in the cushioned padding is partially exposed, from a direction substantially perpendicular or oblique relative to the exposed axial portion of the tensioning wire W. The insertion of the tip end portion 12a of the insertion arm 12 is performed until the tip end portion 12a reaches the position just under the exposed axial portion of the tensioning wire W. Then, the cutout groove 12b of the insertion arm 12 is brought to a condition where it engagingly receives the second region of the exposed axial portion of the tensioning wire W therein. In this condition, the entire automatic-mounting tool is pulled in such a direction as to be away from the recess portion of the cushioned padding, to thereby draw the tensioning wire W.

In the condition where the tensioning wire W has been drawn, when the drive cylinder 13 is driven by operating the trigger 16, the clip holder 10 holding the clip C is moved toward the first region of the axial portion of the tensioning wire W held by the insertion arm 12 via the cutout groove 12b. As the clip holder 10 is moved toward the first region of the axial portion of the tensioning wire W, a space between the hook portion 3 and the guide portion 4 of the clip operatively receives the first region of the exposed axial portion of the tensioning wire W, the second region of the exposed axial portion of which has been engagingly received in the cutout groove 12b of the insertion arm 12, and the hook portion 3 of the clip C is automatically hooked and retained to the first region of the axial portion of the tensioning wire W which is guided by the guide portion 4. During the movement of the clip holder 10, the clip C can be guided by the guide edge portion 11b of the guide plate 11, so that the clip can be prevented from being shifted laterally.

By slightly twisting the entire tool in a clockwise or counterclockwise direction after the hook portion 3 of the clip C is retained to the first region of the exposed axial portion of the tensioning wire W, the second region of the axial portion of the tensioning wire can be released from the cutout groove 12b of the insertion arm 12. In this condition, when the entire tool is pulled in such a direction as to be away from the recess portion of the cushioned padding, the clip C which has been retained at the hook portion 3 to the first region of the axial portion of the tensioning wire can be released from the clip holder 10.

Figure 8:
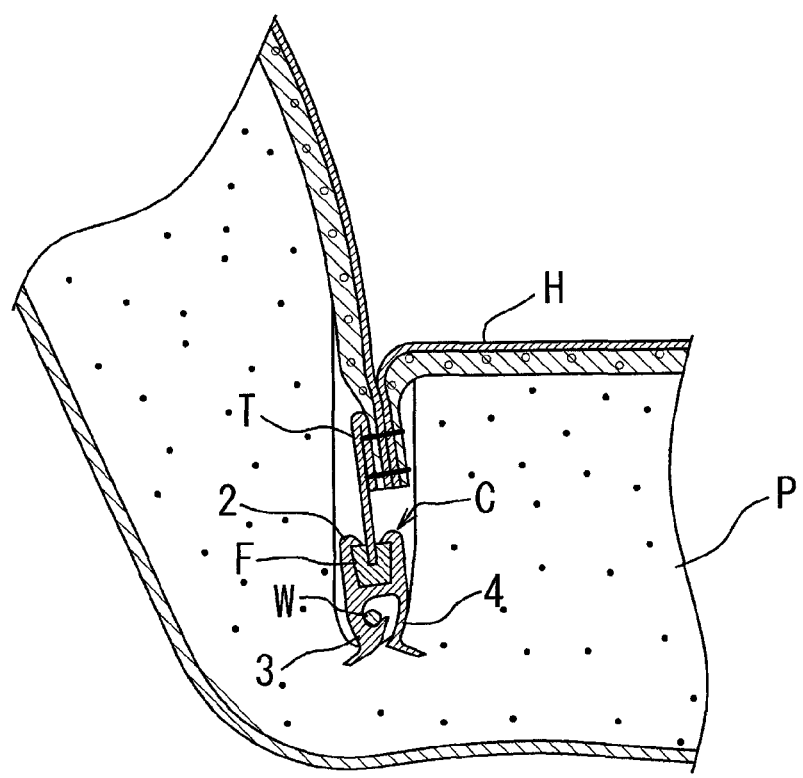
FIG. 8 is a schematic view which is of assistance in explaining a structure in which a terminal portion of a seat skin covering a cushioned padding for a seat is retained to an axial portion of a tensioning wire embedded in the cushioned padding and tensioned by the clip shown in FIG. 1.

Referring to FIG. 8, a seat skin H covering the cushioned padding P has a terminal portion to which a tensioning cord T is attached. The tensioning cord T is provided at a lower end thereof with a welt F. By causing the welt F of the tensioning cord T to be interposedly held by the chuck portion 2 of the clip C having been retained to the axial portion of the tensioning wire W, the terminal portion of the seat skin H covering the cushioned padding P can be tensioned and retained to the axial portion of the tensioning wire W by the clip C.

The terms and expressions which have been employed are used as terms of description and not of limitation, and there is no intention in the use of such terms and expressions of excluding any equivalents of the features shown and described, or portions thereof, but it is recognized that various modifications are possible within the scope of the invention claimed.

The invention claimed is:

1. A clip automatic-mounting tool for automatically mounting a clip to a first region of an axial portion of a tensioning wire embedded in a cushioned padding for a seat, said clip being adapted to be retained between a tensioning cord of a seat skin covering said cushioned padding and said first region of said axial portion of said tensioning wire, and said clip including a hook portion to be hooked and retained to said first region of said axial portion of said tensioning wire, said clip automatic-mounting tool comprising:
   a base frame;
   a drive cylinder provided on a rearward portion of said base frame and having a rod;
   a guide plate extending forward from a forward end portion of said base frame;
   a clip holder for holding said clip so as to allow said hook portion of said clip to be protruded forward from said clip holder;
   said clip holder being connected to a tip end of said rod of said drive cylinder and adapted to be slid along said guide plate by drive of said drive cylinder;
   said guide plate including a portion having a first width substantially equal to that of said clip holder, and a tip end portion having a second width wider than the first width; and
   an insertion arm extending along a side edge of the tip end portion of said guide plate and protruding forward in an oblique upward direction from said tip end portion of said guide plate;

said insertion arm having a length that is long enough to allow a tip end portion of said insertion arm to reach a position just under said axial portion of said tensioning wire when said insertion arm is inserted into said cushioned padding;

said insertion arm having a cutout groove formed in said tip end portion thereof for engagingly receiving a second region of said axial portion of said tensioning wire when said insertion arm is inserted into said cushioned padding; and said second region of said axial portion of said tensioning wire being spaced from said first region of said axial portion of said tensioning wire in an axial direction of said tensioning wire, so that when said clip holder having said clip held thereby is driven by the drive cylinder in a state where said second region of said axial portion of said tensioning wire is engagedly received in said cutout groove of said insertion arm, said clip holder is moved toward said first region of said axial portion of said tensioning wire to automatically hook and retain said hook portion of said clip to said first region of said axial portion of said tensioning wire.

2. A clip automatic-mounting tool according to claim 1, wherein said clip holder is formed in a laterally opening U-shape and has an upper horizontal portion, said upper horizontal portion having a chamfered portion provided on an inner surface of a tip end region thereof, said chamfered portion having an oblique slope.

3. A clip automatic-mounting tool according to claim 1, wherein said guide plate is provided with a guide edge portion rising up from said side edge of said tip end portion of said guide plate for preventing lateral shift of said clip held by said clip holder, during the movement of said clip holder.

4. A clip automatic-mounting tool according to claim 1, wherein said cutout groove of said insertion arm extends along a first hypothetical horizontal line which passes through said tip end portion of said insertion arm and is perpendicular to a second hypothetical horizontal line which is parallel to said guide plate and passes through a curved region of said hook portion of said clip held by said clip holder, a substantially center region of a bottom of said cutout groove being located on said first hypothetical horizontal line.

5. A clip automatic-mounting tool according to claim 1, wherein said clip automatic-mounting tool is configured in the form of a hand gun and further includes a grip attached to said base frame, and a trigger provided at said grip for actuating said drive cylinder.

* * * * *